(12) United States Patent
Takimoto et al.

(10) Patent No.: US 8,628,748 B2
(45) Date of Patent: Jan. 14, 2014

(54) PURIFICATION METHOD FOR CARBON MATERIAL CONTAINING CARBON NANOTUBES, CARBON MATERIAL PRODUCED BY THE SAME METHOD, AND RESIN MOLDING, FIBER, HEAT SINK, SLIDER, MATERIAL FOR FIELD ELECTRON EMISSION SOURCE, CONDUCTION AID FOR ELECTRODE, CATALYST SUPPORT

(75) Inventors: Yuji Takimoto, Kanonji (JP); Naoto Ohta, Osaka (JP); Tetsuro Tojo, Osaka (JP)

(73) Assignee: Toyo Tanso Co., Ltd., Osaka (JP)

( * ) Notice: Subject to any disclaimer, the term of this patent is extended or adjusted under 35 U.S.C. 154(b) by 0 days.

(21) Appl. No.: 12/531,283

(22) PCT Filed: Mar. 7, 2008

(86) PCT No.: PCT/JP2008/054159
§ 371 (c)(1),
(2), (4) Date: Sep. 14, 2009

(87) PCT Pub. No.: WO2008/126534
PCT Pub. Date: Oct. 23, 2008

(65) Prior Publication Data
US 2010/0119436 A1    May 13, 2010

(30) Foreign Application Priority Data

Mar. 13, 2007 (JP) ................................. 2007-062789
Jan. 25, 2008 (JP) ................................. 2008-014708

(51) Int. Cl.
*D01F 9/12* (2006.01)
*C01B 31/02* (2006.01)

(52) U.S. Cl.
USPC .................. 423/447.1; 423/447.7; 423/447.8; 423/461; 977/845

(58) Field of Classification Search
USPC ............. 423/461, 447.1, 447.2, 447.3, 447.6, 423/447.7, 445 B; 977/742–754, 842–848; 428/367
See application file for complete search history.

(56) References Cited

U.S. PATENT DOCUMENTS 7,090,819 B2    8/2006  Smalley et al.
2001/0050219 A1*  12/2001  Anazawa et al. ............. 204/173
(Continued)

FOREIGN PATENT DOCUMENTS

CN    1712349 A    12/2005
JP    8-198611 A    8/1996
(Continued)

OTHER PUBLICATIONS

Journet, et al., Production of Carbon Nanotubes, Appl. Phys. A 1998; 67: 1-9.*

(Continued)

*Primary Examiner* — Daniel C. McCracken
(74) *Attorney, Agent, or Firm* — Westerman, Hattori, Daniels & Adrian, LLP

(57) ABSTRACT

A purification method for a carbon material containing carbon nanotubes is provided, which satisfies the following requirements: The method should prevent carbon nanotubes from being damaged, broken or flocculated; the method should be capable of removing the catalyst metal and carbon components other than the carbon nanotubes; and the method should be applicable to not only multi-walled carbon nanotubes but also single-walled carbon nanotubes which will undergo significant structural changes when heated to 1400° C. or higher temperatures. The method is characterized by including a carbon material preparation process for preparing a carbon material containing carbon nanotubes by an arc discharge method, using an anode made of a material containing at least carbon and a catalyst metal; and a halogen treatment process for bringing the carbon material into contact with a gas containing a halogen and/or halogen compound.

2 Claims, 5 Drawing Sheets

(56) References Cited

U.S. PATENT DOCUMENTS

| | | | |
|---|---|---|---|
| 2003/0042128 A1* | 3/2003 | Harutyunyan et al. | 204/158.2 |
| 2005/0205847 A1* | 9/2005 | Dailly et al. | 252/378 R |
| 2010/0008843 A1* | 1/2010 | Hauge et al. | 423/447.1 |

FOREIGN PATENT DOCUMENTS

| | | | |
|---|---|---|---|
| JP | 2003-063814 A | | 3/2003 |
| JP | 2003-201630 A | | 7/2003 |
| JP | 2004-182548 A | | 7/2004 |
| JP | 2004-307334 A | | 11/2004 |
| JP | 2004-339041 A | | 12/2004 |
| JP | 2005-060170 A | | 3/2005 |
| JP | 2006-069850 A | | 3/2006 |
| JP | 2006-306636 | * | 11/2006 |
| JP | 2006-306636 A | | 11/2006 |
| WO | 01/62665 A1 | | 8/2001 |
| WO | 02/064868 A1 | | 8/2002 |
| WO | 02/064869 A1 | | 8/2002 |
| WO | WO 02/064868 | * | 8/2002 |
| WO | 2005/015574 A1 | | 2/2005 |
| WO | 2006/087450 A1 | | 8/2006 |

OTHER PUBLICATIONS

"Earth Fact Sheet," accessed online at http://nssdc.gsfc.nasa.gov/planetary/factsheet/earthfact.html on Apr. 27, 2012.*
Journet, et al., Large-scale production of single-walled carbon nanotubes by the electric-arc technique, Nature 1997; 388: 756-758.*
J. L. Zimmerman et al., "Gas-Phase Purification of Single-Wall Carbon Nanotubes," Chemistry of Materials, 2000, vol. 12 No. 5., pp. 1361-1366, cited in ISR.
C. Journet et al., "Large-scale production of single-walled carbon nanotubes by the electric-arc technique," Nature, Aug. 1997, Issue 388, pp. 756-758, cited in spec.
M. Yudasaka et al., "Structure changes of single-wall carbon nanotubes and single-wall carbon nanohorns caused by heat treatment," Carbon, 2003, Issue 41, Pergamon, pp. 1273-1280, cited in spec.
Yahachi Saitou and Shunji Bandou, Table 2.1, Fundamentals of Carbon Nanotubes, Corona Publishing Co., p. 24, cited in spec.
X. Zhao et al. "Macroscopic oriented web of Single-wall carbon nanotubes," Department of Materials Science and Engineering, Feb. 6, 2003; pp. 267-271, cited in spec.
International Search Report of PCT/JP2008/054159, date of mailing Jun. 10, 2008.
Chinese Office Action dated Oct. 19, 2011, issued in corresponding Chinese Patent Application No. 200880007896.9.
Database WPI Week 200701 Thomson Scientific, London, GB; An 2007-004323 XP00266862, - & JP 2006 306636 A (Mitsubishi Jukogyo KK) Nov. 9, 2006 (Sep. 11, 2006).
European Search Report dated Mar. 6, 2012, issued in corresponding European Patent Application No. 08721577.8.
Chinese Office Action dated Jul. 17, 2012, issued in corresponding Chinese Patent Application No. 200880007896.9, (28 pages). With English Translation.
European Search Report dated Dec. 20, 2012, issued in corresponding European patent application No. 08 721 577.8.
Chinese Office Action dated Dec. 18, 2012, issued in corresponding Chinese Patent Application No. 200880007896.9, (28 pages), w/ English Translation.
Japanese Office Action mailed Mar. 5, 2013, issued in corresponding Japanese Patent Application No. 2009-508982; with English translation (13 pages).
Taiwanese Office Action dated Jun. 26, 2013, issued in corresponding Taiwanese Patent Application No. 097108736, w/ English translation.
Japanese Office Action dated Jul. 3, 2013, issued in corresponding Japanese Patent Application No. 2009-508982, w/ English translation.

* cited by examiner

PURIFICATION METHOD FOR CARBON MATERIAL CONTAINING CARBON NANOTUBES, CARBON MATERIAL PRODUCED BY THE SAME METHOD, AND RESIN MOLDING, FIBER, HEAT SINK, SLIDER, MATERIAL FOR FIELD ELECTRON EMISSION SOURCE, CONDUCTION AID FOR ELECTRODE, CATALYST SUPPORT

TECHNICAL FIELD

The present invention relates to a purification method for carbon materials containing carbon nanotubes, and also to the carbon materials produced by this purification method. Such carbon materials are used in many forms, such as electrode materials for batteries or electrical double-layer capacitors, probes of scanning tunneling microscopes, conductive materials, and reinforcing materials for resins or ceramics.

BACKGROUND ART

The aforementioned carbon nanotubes have a structure consisting of a cylindrically rolled network of six-membered rings of carbon element. They can be roughly classified into single-walled carbon nanotubes and multi-walled carbon nanotubes according to the number of graphene sheets (i.e. the number of walls) forming a single tube. Multi-walled carbon nanotubes with two or three walls may also be called double-walled or triple-walled carbon nanotubes, respectively.

Due to their simple structures, single-walled carbon nanotubes have enjoyed more rapid progress in theoretical analyses than multi-walled types. It has been theoretically suggested that they exceed any existing materials in terms of thermal conductivity, elastic coefficient, tensile strength and allowable current density, and have ballistic electron conductivity as well as semiconductor properties. Currently, many of those properties are being experimentally demonstrated and developed into application studies.

An ultrafine carbon fiber that is not tubular but a simple fiber is called a carbon nanofiber and should be distinguished from carbon nanotubes (especially, single-walled carbon nanotubes). This is because the aforementioned characteristics that are expected from carbon nanotubes result from their tubular structure and cannot be achieved by carbon nanofibers that simply consist of ultrafine carbon fibers.

There are several known methods for the synthesis of carbon nanotubes, such as arc discharge, laser evaporation and chemical vapor deposition (CVD). Among these methods, arc discharge is expected to be suitable for the synthesis of carbon nanotubes since this technique is capable of synthesizing a larger amount of carbon nanotubes than laser evaporation and is also superior to CVD in terms of the crystallinity of the resulting nanotubes.

A process of synthesizing carbon nanotubes by arc discharge includes the steps of filling a vacuum chamber with an inert gas (e.g. helium or argon) or hydrogen-containing gas (e.g. hydrogen, or hydrogen sulfide) to a pressure of approximately 100 to 500 Torr and then generating an arc discharge between the carbon electrodes facing each other within the vacuum chamber to evaporate the carbon electrode on the positive side, which contains carbon and a catalyst metal. It is known that a substance deposits on the cathode during this synthesizing process. This substance is called the cathode deposit.

Positive carbon electrodes used in the arc discharge method can be roughly classified into pure carbon electrodes with no metal content and metal-carbon composite electrodes containing a catalyst metal. Using a pure carbon electrode as the anode tends to result in the formation of multi-walled carbon nanotubes in the substance deposited on the cathode, whereas using a metal-carbon composite electrode as the anode is likely to cause a deposition of single-walled carbon nanotubes onto the inner wall surface of the chamber. For the catalyst metal used in the metal-carbon composite electrode, the iron-group elements (e.g. Fe, Ni or Co) are commonly used. It is said that adding 0.3 to 5 mol % of an iron-group element enables the element to act as the catalyst to produce carbon nanotubes (refer to Non-Patent Document 1 to be mentioned later).

It is also known that the amount of the resulting single-walled carbon nanotubes can be increased by using a binary system of Ni and Y as the catalyst metals rather than using only an iron-group element (refer to Non-Patent Document 2 to be mentioned later).

In addition, it is known that, if a metal-carbon composite electrode containing iron is used as the anode and a hydrogen gas as the atmospheric gas in the arc discharge, the resulting carbon material will barely contain amorphous carbon (i.e. the percentage of carbon nanotubes will be high) because hydrogen removes amorphous carbon (refer to Non-Patent Document 3 to be mentioned later).

As just explained, the production of single-walled carbon nanotubes by arc discharge requires a catalyst metal. However, this catalyst metal must be treated as an impurity when the carbon nanotubes are to be used after purification. Accordingly, it is necessary to adequately purify the carbon nanotubes by removing the impurities so as to isolate only the carbon nanotubes and improve their basic properties for various applications. As such purification techniques, the following methods have been known:

(1) Wet purification, in which the catalyst metal is dissolved in an aqueous acid solution, such as an aqueous solution of hydrochloric acid or sulfuric acid (refer to Patent Document 1 to be mentioned later).

(2) Heat treatment, in which the temperature is raised to a level higher than the boiling point of the catalyst metal to evaporate the catalyst metal away (refer to Non-Patent Document 4 to be mentioned later).

Patent Document 1: JP-A 8-198611

Non-Patent Document 1: Yahachi Saitou and Shunji Bandou, *Kaabon Nanochuubu No Kiso* (*Fundamentals of Carbon Nanotubes*), Corona Publishing Co., Ltd., 1998

Non-Patent Document 2: C. Journet et al., *Nature*, 388, 1997, 756-758

Non-Patent Document 3: X. Zhao, *Chem. Phys. Lett,* 373, 2003, 266-271

Non-Patent Document 4: *Carbon,* 41, 2003, 1273-1280

DISCLOSURE OF THE INVENTION

Problems to be Solved by the Invention

The previously described methods have the following problems:

Problems Associated with Method (1)

Method (1) uses ultrasonic radiation to disperse carbon nanotubes in the acid aqueous solution. This causes the tubes to be damaged or broken, which can result in various problems, such as the deterioration in the performances of the carbon nanotubes or the flocculation of the tubes during the drying process after the acid treatment. Carbon nanotubes in the flocculated state are hard to be dispersed in high polymer materials or the like.

Problems Associated with Method (2)

In method (2), a molten catalyst metal may form a solid solution of carbon and cause a re-precipitation of carbon in the form of graphite before the catalyst metal reaches the boiling point. If this catalyst graphitization occurs, the single-walled or multi-walled carbon nanotubes, or amorphous carbon, will be converted into graphite. The graphite component resulting from catalyst graphitization is difficult to remove, forming an undesirable impurity for carbon nanotubes. It is also known that single-walled carbon nanotubes cannot be heated to a temperature higher than 1400° C. since the tubes will undergo structural changes at such a high temperature.

The present invention has been developed in view of these problems. Its objective is to provide a purification method for a carbon material containing carbon nanotubes; the method satisfying the following requirements:

The method should prevent carbon nanotubes from being damaged, broken or flocculated;

The method should be capable of removing the catalyst metal and carbon components other than the carbon nanotubes; and The method should be applicable to not only multi-walled carbon nanotubes but also single-walled carbon nanotubes which will undergo significant structural changes when heated to 1400° C. or higher temperatures.

The present invention also provides a carbon material obtained by this purification method.

Means for Solving the Problems

One aspect of the present invention aimed at achieving the aforementioned objectives is a method including:

a carbon material preparation process for preparing a carbon material containing carbon nanotubes by an arc discharge method, using an anode made of a material containing at least carbon and a catalyst metal; and a halogen treatment process for bringing the carbon material into contact with a gas containing a halogen and/or halogen compound.

In a purification method in which the carbon material is treated with a halogen gas or the like (dry purification process), the purification (or refinement) can be achieved without using ultrasonic radiation. It is therefore possible to remove the catalyst metal as an impurity while preventing the carbon nanotubes from being damaged, broken or flocculated.

The use of arc discharge in the preparation of a carbon material containing carbon nanotubes results in the synthesis of carbon nanotubes in large quantity and with a high degree of crystallinity.

At this point, the aforementioned halogen treatment process is briefly explained to make the subsequent discussions easier to understand: When a portion of the surface of the catalyst metal is not covered with a carbon coating (composed of amorphous carbon or graphite), the catalyst metal will come in contact with the halogen gas, whereby the catalyst metal can be removed. On the other hand, if the entire surface of the catalyst metal is covered with the carbon coating, the catalyst metal is difficult to remove since it cannot come in contact with the halogen gas.

For convenience, the term "catalyst metal" in this patent application refers to any metal that can directly affect the process of producing carbon nanotubes (e.g. iron, copper, nickel or other iron-group metals).

It is preferable to provide an oxidation treatment process for bringing the carbon material into contact with an oxygen-containing gas between the carbon material preparation process and the halogen treatment process, or after the halogen treatment process.

The inclusion of the oxidation treatment process enables the present method to mainly remove carbon components other than the carbon nanotubes (e.g. amorphous carbon and other impurities), whereby the carbon material is further purified. Since this process is a dry process using an oxygen gas and other gases, no after-treatments such as washing and drying are required, and hence the flocculation of carbon nanotubes is also prevented in this process.

Although the oxidation treatment process can be performed not only after the halogen treatment process but also between the carbon material preparation process and the halogen treatment process, it is desirable to perform it after the halogen treatment process. The reason is as follows. Catalyst metals have an extremely strong catalytic effect on the oxidation of carbon. Therefore, if the oxidation treatment is carried out before the halogen treatment process is performed to remove the catalyst metal, it is possible that a large amount of carbon nanotubes will be burnt (or oxidized) as well as unnecessary carbon components other than the carbon nanotubes. Accordingly, it is preferable to perform the oxidation treatment after the majority of the catalyst metal is removed by the halogen treatment process. This sequence will prevent carbon nanotubes from being burnt in large quantity and consequently increase the yield of the carbon nanotubes.

It is desirable that the material of the anode used in the carbon material preparation process contain at least one kind of metal selected from the group of rare-earth metals.

There are the following two reasons why the material of the anode used in the carbon material preparation process should contain at least one kind of metal selected from the group of rare-earth metals:

(1) Compared to the iron-group metals, rare-earth metals themselves are much less effective in their direct action on the production of carbon nanotubes. However, these metals can act as a promoter for the evaporation in the arc discharge process. This means that adding a rare-earth metal to the iron-group metal (such as nickel or iron) helps carbon nanotubes grow more rapidly than in the case of solely using nickel, iron or the like.

(2) After the preparation of carbon nanotubes, a certain amount of rare-earth metal is present within the carbon nanotubes; however, most of the rare-earth metal is found within the amorphous carbon or graphite coating formed on the surface of the catalyst metal such as nickel or iron. If the oxidation treatment is performed in this state, the rate-earth metal acts as an oxidation catalyst to remove the amorphous carbon or graphite on the surface of the catalyst metal. Amorphous carbon can be removed to some extent by the oxidation treatment even without the rare-earth metal. However, graphite has a high degree of crystallinity and hence is difficult to remove in the absence of a rare-earth metal. Thus, the rare-earth metal is primarily useful for the removal of graphite by oxidation. A probable reason for the presence (or microdispersion) of the rare-earth metal within the amorphous carbon or graphite coating is because rare-earth metals in general readily form carbides, so that a phase separation hardly occurs between amorphous carbon or graphite and the rare-earth metal.

The rare-earth metal also exists on the surface of the carbon nanotubes, and one might think this could also have a negative impact on the oxidation treatment. However, this impact is negligibly small since, as already explained, most of the rare-earth metal exists in the amorphous carbon or graphite coating while only a small quantity is left within the carbon nanotubes.

Some conventional CVD processes for preparing carbon nanotubes also use rare-earth metals such as yttrium. In this technique, the rare-earth metal is supported on the surface of or inside the pores of porous carriers made of alumina or other materials. It should be noted that rare-earth metals used in this manner do not have the function of facilitating the removal of amorphous carbon or graphite by the oxidation treatment.

It is desirable that yttrium be used as the rare-earth metal in the present invention.

Examples of rare-earth metals include scandium, lanthanum and yttrium, where yttrium is less expensive than the other rare-earth metals. Therefore, when yttrium is used, the production and purification costs of the carbon materials will be reduced.

In the case of performing the oxidation treatment process after the halogen treatment process, it is desirable that another halogen treatment process be performed after the oxidation treatment process.

As explained earlier, after the amorphous carbon or graphite coating on the surface of the catalyst metal is removed by the oxidation treatment process, the catalyst metal is exposed. Therefore, by performing the halogen treatment process once more after the oxidation treatment process, it is possible to remove the catalyst metal even if the metal has been entirely covered with graphite or the like in the carbon material preparation process.

If a rare-earth metal is added, not only amorphous carbon but also graphite having a high degree of crystallinity can be removed in the oxidation treatment process, so that the catalyst metal can be more assuredly removed during the second halogen treatment process.

It is desirable that the halogen treatment process be performed within an ambient temperature range from 600° to 1600° C.

The reason for this temperature control is as follows:

If a gas containing a halogen or halogen compound is brought into contact with a carbon material containing carbon nanotubes at temperatures lower than 600° C., the catalyst metal or other metallic impurities contained in the carbon material will be converted into a chlorine compound, which is difficult to be evaporated. On the other hand, the catalyst graphitization due to metallic impurities will be remarkable at temperatures higher than 1600° C. To avoid these problems, it is desirable to perform the halogen treatment process within an ambient temperature range from 600° to 1600° C.

Performing the halogen treatment process at temperatures lower than 800° C. decreases the removal efficiency since the temperature is approximately equal to the boiling points of the halides of chlorine compounds, whereas performing the same process at temperatures exceeding 1300° C. results in a variation in the diameter of single-walled carbon nanotubes. To prevent such undesirable conditions, it is further desirable to perform the halogen treatment process within a temperature range from 800° to 1300° C.

In the case where the material of the anode contains at least one kind of metal selected from the group of rare-earth metals and the halogen treatment process is followed by the oxidation treatment process and another halogen treatment process, it is desirable that the halogen treatment process after the oxidation treatment process be performed at a higher temperature than the halogen treatment process before the oxidation treatment process.

It is desirable that only the catalyst metal such as nickel (i.e. the catalyst metal whose surface is at least partially exposed after the carbon material preparation process) be removed in the halogen treatment process before the oxidation treatment process. The reason is as follows. If the rare-earth metal is also removed during the halogen treatment process before the oxidation treatment process, graphite may not be removed by the subsequent oxidation treatment process. If this occurs, it will be impossible to remove the catalyst metal (i.e. the catalyst metal whose surface is entirely covered by graphite or other materials after the carbon material preparation process) in the second halogen treatment process after the oxidation treatment process. Accordingly, it is desirable that the halogen treatment process before the oxidation process be performed at a temperature where only the catalyst metal (e.g. Ni) can be removed, i.e. approximately within a temperature range from 800° to 1000° C.

The rare-earth metal can exhibit the previously described excellent effects in the oxidation treatment process and yet will be an impurity after the oxidation treatment process is completed. It is therefore preferable to remove the rare-earth metal as well as the catalyst metal (i.e. the catalyst metal that is entirely covered with graphite or other materials after the carbon material preparation process) in the halogen treatment process after the oxidation treatment process. Accordingly, the halogen treatment process should preferably be performed at a temperature where not only the catalyst metal but also the rare-earth metal can be removed, i.e. at approximately 1200° C. or higher.

It is desirable that a chlorine gas be used as the gas in the halogen treatment process.

The use of the chlorine gas is preferable because chlorine is less reactive for carbon nanotubes than fluorine or other kinds of halogen gas and effective in reducing damage to the carbon nanotubes during the halogen treatment process. A halogen compound gas composed of chlorine and carbon may also be used as the gas for this process. However, using this compound gas may cause some problems, such as the constituent carbon forming an impurity and precipitating onto the carbon material. Therefore, as stated earlier, it is preferable to use a chlorine gas (especially, a pure chlorine gas).

It is preferable that the oxidation treatment process be performed within an ambient temperature range from 250° to 800° C.

Although the temperature at which the oxidation of amorphous carbon initiates is lower than that of carbon nanotubes or graphite, it is recommended to use a temperature of 250° C. or higher to smoothly remove the amorphous carbon in the oxidation treatment process. However, it should be noted that performing the oxidation treatment process at a temperature exceeding 800° C. initiates the oxidation of not only the amorphous carbon but also carbon nanotubes and other components, which may result in the simultaneous burning of all the carbon components due to the high oxidation rate. Given these factors, it is preferable to perform the oxidation treatment process within an ambient temperature range from 250° to 800° C. Particularly, the temperature should be 350° C. or higher so as to shorten the oxidation time. Additionally, the temperature should be 500° C. or lower so as to avoid the oxidation of carbon nanotubes.

Another aspect of the present invention aimed at achieving the previously mentioned objectives is a method including:

a carbon material preparation process for preparing a carbon material containing carbon nanotubes by using a material containing at least carbon and a catalyst metal;

a halogen treatment process for bringing the carbon material into contact with a gas containing a halogen and/or halogen compound; and an oxidation treatment process for bringing the carbon material into contact with an oxygen-containing gas.

This purification method is a dry purification process that uses halogen gas, oxygen gas and other gases to treat the carbon material. By using such a dry process, it is possible to remove catalyst metals and other impurities while preventing carbon nanotubes from being damaged, broken or flocculated.

As explained earlier, the inclusion of the oxidation treatment process enables the present method to mainly remove carbon components other than the carbon nanotubes (e.g. amorphous carbon and other impurities), whereby the carbon material is further purified. Since this process is a dry process using an oxygen gas and other gases, no after-treatments such as washing and drying are required, and hence the flocculation of carbon nanotubes in this process is also prevented.

The preparation of the carbon material may use arc discharge, laser evaporation, chemical vapor deposition (CVD) or other methods.

It is desirable that the oxidation treatment process be performed after the halogen treatment process.

As explained earlier, performing these two processes in this order prevents carbon nanotubes from being burnt in large quantity and consequently increases the yield of the carbon nanotubes.

It is desirable that the material of the anode used in the carbon material preparation process contain at least one kind of metal selected from the group of rare-earth metals.

Among the previously described effects obtained by the addition of a rare-earth metal, the effect of facilitating the growth of carbon nanotubes will be particularly remarkable when the carbon material is prepared by CVD. In the case of preparing the carbon material by arc discharge or laser evaporation, the effect of oxidizing and removing graphite having a high degree of crystallinity in the oxidation treatment process can also be obtained in addition to the effect of facilitating the growth of carbon nanotubes.

It is desirable to use yttrium as the rare-earth metal.

As explained earlier, using yttrium as the rare-earth metal reduces the production and purification costs of the carbon material.

It is desirable that another halogen treatment process be performed after the oxidation treatment process.

As already explained, by performing the halogen treatment process once more, it is possible to remove a catalyst metal that has been entirely covered with amorphous carbon or the like in the carbon material preparation process.

It is desirable that the halogen treatment process be performed within an ambient temperature range from 600° to 1600° C.

As explained earlier, the use of this temperature range facilitates the removal of metallic impurities such as the catalyst metal and also prevents the metallic impurities from vaporizing before they are converted into chlorine compounds. The temperature should more preferably be within a range from 800° to 1300° C. for the same reasons as already explained.

In the case where the material of the anode contains at least one kind of metal selected from the group of rare-earth metals and the halogen treatment process is followed by the oxidation treatment process and another halogen treatment process, it is desirable that the halogen treatment process after the oxidation treatment process be performed at a higher temperature than the halogen treatment process before the oxidation treatment process.

As explained earlier, controlling the operation in this manner makes it possible to remove the catalyst metal and rare-earth metal while removing amorphous carbon and graphite.

It is desirable that a chlorine gas be used as the gas used in the halogen treatment process.

As explainer earlier, the use of chlorine gas prevents carbon nanotubes from being damaged during the halogen treatment.

It is desirable that the oxidation treatment process be performed within an ambient temperature range from 250° to 800° C.

As explained earlier, performing the oxidation treatment process within this temperature range ensures smooth removal of amorphous carbon and also prevents the initiation of simultaneous burning of the entire carbon components. The temperature should more preferably be within a range from 350° to 500° C. for the same reasons as already explained.

Another aspect of the present invention aimed at achieving the previously described objectives is a carbon material obtained by any of the previously described purification methods for a carbon material containing carbon nanotubes.

It is additionally desirable that the concentration of metallic impurities be equal to or less than 5% by weight of the total amount of the carbon material in the case where the concentration is determined by a thermogravimetry/differential thermal analysis of the ash content.

Preparing the carbon material in this manner reduces the concentration of metallic impurities and dramatically improves the percentage of carbon nanotubes. The metallic impurity concentration should be equal to or less than 5% by weight of the total amount of the carbon material, preferably equal to or less than 1.0% by weight, and more preferably equal to or less than 0.1% by weight. The reduction in the concentration of the metallic impurities with respect to the total amount of the carbon material can be achieved by controlling the temperature for the halogen treatment or the amount of the rare-earth metal, e.g. yttrium, contained in the material of the anode. In general, carbon nanotubes should preferably have a high level of purity. However, the high purity may not always be required for some applications. Accordingly, it is desirable to control the concentration of the metallic impurities while taking into account the purification cost.

It is desirable that the G/D ratio in a spectrum obtained by a Raman spectroscopic measurement be equal to or larger than 80, where G is the maximum peak intensity within a range from 1570 to 1610 $cm^{-1}$ and D is the maximum peak intensity within a range from 1320 to 1360 $cm^{-1}$.

Preparing the carbon material in this manner results in the G/D ratio being equal to or larger than 80, which means that the degree of graphitization is so high that a high-quality carbon nanotube will be obtained.

It is desirable that the adsorption rate measured by the water-vapor adsorption method be equal to or lower than 200 cc/g.

This preparation method prevents the carbon material from coming in contact with an aqueous solution of hydrochloric acid or sulfuric acid and thereby reduces the addition of surface functional groups, which notably occurs in a wet purification process. Thus, a high-quality carbon nanotube will be obtained. It is more desirable that the adsorption rate measured by the water-vapor adsorption method be equal to or lower than 130 cc/g.

It is desirable that the O/C value calculated by a sensitivity coefficient method using X-ray photoelectron spectroscopy be equal to or smaller than 0.032.

The O/C value calculated by a sensitivity coefficient method using X-ray photoelectron spectroscopy is correlated with the amount of the aforementioned water-vapor adsorption. In the case of using the O/C value to control the carbon material, it is desirable that the value be 0.032 or smaller, and particularly 0.016 or smaller.

A resin molding which is characterized by being made of a synthetic resin in which the aforementioned carbon material is mixed.

The carbon material according to the present invention can be easily dispersed into synthetic resins. By mixing the carbon material into a synthetic resin and molding the mixture, a resin molding that is excellent in mechanical strength, thermal conductivity, electrical conductivity and other functional properties can be obtained with stabilized qualities; those characteristics will be particularly high in the orientation direction of the carbon material. There are no specific limitations to the choice of the synthetic resin; both thermoplastic and thermosetting types of synthetic resins can be used. The molding method can also be any appropriate method, such as the extrusion molding, injection molding, cast molding and blow molding. It is also possible to create a multi-layer molding with the carbon material mixed in one of the layers, e.g. only in the surface layer. This configuration enables the aforementioned characteristics to be achieved with a reduced amount of the carbon material.

A fiber which is characterized by being created using the aforementioned carbon material.

As in the case of the resin molding, the aforementioned carbon material can be uniformly dispersed in fiber filaments to stabilize the qualities of the fiber. Particularly, when the fiber is thin, normal types of carbon materials cannot be uniformly dispersed in it, causing the resulting fiber to be breakable. By contrast, the carbon material according to the present invention can be uniformly dispersed even in a thin filament and thereby prevent the fiber from being broken.

A heat sink which is characterized by being created using the aforementioned carbon material.

Adding a carbon material to a heat sink enhances the thermal conductivity of the heat sink and thereby improves the heat-dissipating efficiency. However, if the carbon material is not uniformly dispersed in the heat sink, the thermal conductivity within the heat sink will be uneven, which will impede uniform heat dissipation. On the other hand, the carbon material according to the present invention is highly dispersible and can be uniformly dispersed in the heat sink. Therefore, the thermal conductivity within the heat sink can be prevented from being uneven. As a result, the heat dissipation will uniformly take place. The heat sink can be created, for example, by mixing a carbon material into a resin, or by molding a complex from a resin with a carbon material kneaded therein and graphitizing the complex.

A slider which is characterized by being created using the aforementioned carbon material.

Adding a carbon material to a slider enhances the abrasion resistance of the slider. However, if the carbon material is not uniformly dispersed in the slider, the abrasion resistance may decrease at some portions where the percentage of the carbon material is low, causing only those portions to be worn out. On the other hand, the carbon material according to the present invention is highly dispersible and will be uniformly dispersed in the slider. The resultant slider has a stable abrasion resistance and is less susceptible to partial abrasion or other problems. As in the case of the heat sink, the slider can be created, for example, by mixing a carbon material into a resin, or by molding a complex from a resin with a carbon material kneaded therein and graphitizing the complex.

A conductive film which is characterized by being created using the aforementioned carbon material.

Adding a carbon material to a film makes the film electrically conductive. However, if the carbon material is not uniformly dispersed within the film, the conductivity may decrease at some portions where the percentage of the carbon material is low. On the other hand, the carbon material according to the present invention is highly dispersible and will be uniformly dispersed in the film, so that the resultant film will have a high degree of conductivity. The conductive film can be created by kneading a carbon material into the film or mixing a carbon material into the surface of the film, where the latter method is more desirable to make the film adequately conductive. One example of a method for mixing the carbon material into the film surface includes forming a plurality of layers in the film formation process, such as blow molding. Another example involves applying paint, with the carbon material mixed therein, to a film body.

A source material for field electron emission, which is characterized by being created using the aforementioned carbon material.

The high purity of the carbon material according to the present invention leads to a stabilized internal quality of the material. Using such a material as a source material for field electron emission makes it possible, for example, to reduce the fluctuation of emission. Additionally, if the carbon material has an improved G/D ratio, there will be fewer defects within the graphene sheet. Using such a material as an electron emission source makes its crystal lattice less liable to collapse, thus improving the durability of the source.

A conduction aid for an electrode, which is characterized by being created using the aforementioned carbon material.

The high electrical conductivity of the carbon material according to the present invention enables the same material to be used for decreasing the internal resistance of an electrode and thereby improving the charging/discharging efficiency of a cell, battery or capacitor. Furthermore, the enhanced purity of the carbon material helps self-discharging due to the impurity elements contained in the same material, and also reduces quality alteration or precipitation of the solvent and electrolyte (solute) of the cell due to an elution of the impurities. Additionally, if the carbon material has an improved G/D ratio, there will be fewer defects within the graphene sheet, which further decreases the internal resistance of the electrode. Therefore, the aforementioned battery devices will have an enhanced energy conversion efficiency, output density, energy density and so on in addition to the improvements of the aforementioned properties.

The conductive aid for an electrode according to the present invention is applicable in any kinds of generally used electrodes, and particularly suitable as a conductive aid for the electrode used in a lithium-ion secondary battery or double layer condenser.

A catalyst support which is characterized by being created using the aforementioned carbon material.

Carbon is suitably used as a catalyst support since it can be barely decomposed by catalysts. The carbon material according to the present invention consists of extremely pure nanoscale fibers and is therefore easy to achieve a large specific surface area. Accordingly, it is possible to increase the contact area for the reaction of the catalyst with an objective reactant, to obtain a catalyst support having a high level of reaction efficiency. Since the catalyst metal that is used during the synthesis is removed at high percentages, it is least possible that a remaining catalyst acts as a poison. Thus, a support that does not seriously inhibit the reaction can be obtained.

Effects of the Invention

The present invention achieves the advantageous effect of removing catalyst metals and carbon components other than carbon nanotubes while preventing the carbon nanotubes from being damaged, broken or flocculated. Another advantageous effect is that the present invention can be used to purify single-walled carbon nanotubes, which undergo significant changes at temperatures equal to or higher than 1400° C., as well as multi-walled carbon nanotubes.

The present invention also has the following advantageous effects: the concentration of metallic impurities in a soot-like powder containing carbon nanotubes can be reduced, so that the metallic impurity concentration measured by ash content analysis is dramatically lowered; the G/D ratio measured by Raman spectroscopy becomes higher since the carbon nanotubes are prevented from being damaged; and the dry purification process reduces the addition of surface functional groups.

BEST MODE FOR CARRYING OUT THE INVENTION

The present invention is hereinafter described in detail. It should be noted that the best mode and examples to be described hereafter do not limit the scope of the present invention.

A. Apparatus Used in the Best Mode (Apparatus for Producing Carbon Material)

FIG. 1 shows an apparatus for producing a carbon material containing single-walled carbon nanotubes by arc discharge. (This apparatus may be hereafter called the carbon material production apparatus.) As shown in FIG. 1, this carbon material production apparatus has an upper chamber 1 and a lower chamber 2. These chambers 1 and 2 communicate with each other through a line 3. Within the lower chamber 2, an anode 4 and cathode 5 are arranged parallel to each other. The distance between the two electrodes 4 and 5 is L1=5 mm.

The anode 4 is made of a metal/carbon composite material containing Ni (nickel):Y (yttrium) at a molar percentage of 4.2:1.0, and has a rectangular parallelepiped shape measuring 15 mm in height, 15 mm in width and 300 mm in length. The cathode 5 is made of graphite and has a columnar shape measuring 30 mm in diameter and 50 mm in length. On the other hand, the upper chamber 1 contains a cold trap 6, within which a line (not shown) for supplying liquid nitrogen is provided. When a voltage is applied between the two electrodes 4 and 5, the carbon and metal components (Ni and Y) are evaporated from the anode 4. The vapors of those components are cooled by the cold trap 6, to form a carbon material 9 containing single-walled carbon nanotubes within the upper chamber 1. (This material is a chamber soot and may be hereafter called the unpurified carbon material.)

(Halogen Treatment Apparatus)

FIG. 2 is a conceptual diagram illustrating a halogen treatment apparatus for controlling the process of purifying an unpurified carbon material produced by the previous apparatus. As shown in FIG. 2, the halogen treatment apparatus according to the present embodiment has a stainless steel chamber 11 within which a heat-insulating layer 12 made of a carbon fiber felt is provided. The heat-insulating layer 12 surrounds a heater 13 made of carbon, inside which a susceptor 14, also made of carbon, is provided. Located inside this susceptor 14 is a crucible 15 made of carbon, with the unpurified carbon material 9 enclosed therein. For the purpose of preventing impurities from being mixed into the unpurified carbon material 9, the susceptor 14 and crucible 15 should be highly purified beforehand.

The chamber 11 is a vacuum chamber, in the upper portion of which a gas discharge line 16 communicating with the inside of the chamber 11 is provided. The gas discharge line 16 has a pump 18 by which the chamber 11 can be maintained in a vacuum state. On the other hand, in the lower portion of the upper chamber 11, a gas supply line 17 communicating with the inside of the chamber 11 is provided to introduce an inert gas containing chlorine gas into the chamber 11. After chlorinating the unpurified carbon material, the inert gas containing chlorine gas passes through a dust catcher 19 and the vacuum pump 18, both provided in the gas discharge line 16, and undergoes neutralization by caustic soda in a scrubber 20, to be eventually released to the atmosphere in a harmless form. The numeral 21 in FIG. 2 denotes a mesh-like bottom plate. The mesh structure enables the inert gas containing chlorine gas to be smoothly introduced into the susceptor 14.

(Oxidation Treatment Apparatus)

FIG. 3 is a conceptual diagram illustrating an oxidation treatment apparatus for controlling the process of further purifying the carbon material containing carbon nanotubes which has been primarily purified by the halogen treatment apparatus. As shown in FIG. 3, the oxidation treatment apparatus according to the present embodiment has a tube-shaped oxidation treatment furnace 31 with each end tightly closed with a seal port 32 or 33 made of stainless steel. The seal port 33 has a gas introduction line 33a, which is connected via a line 38 with a first cylinder 34 filled with argon gas and a second cylinder 35 filled with argon gas and oxygen gas. With this system, either the argon gas or a mixture of argon gas and oxygen gas can be introduced into the oxidation treatment furnace 31. The numerals 34a and 35a denote gas flowmeters. On the other hand, the other seal port 32 has a gas discharge line 32a, to which a line 39 for discharging the gas from the inside to the outside of the oxidation treatment furnace 31 is connected.

A heater 36 for heating the inside of the oxidation treatment furnace 31 is provided outside the oxidation treatment furnace 31, while a crucible 37 made of quartz is provided inside the oxidation treatment furnace 31. As shown in FIGS. 4(a) and 4(b), the crucible 37 has a tube-like main body 37a, with a side wall 37b at one end of the main body 37a. The side wall 37b has a large number of holes 37c bored therein. The aforementioned gas is passed through these holes 37c to form a gas flow, which uniformly comes in contact with the carbon material that has been finished with the halogen treatment in the apparatus shown in FIG. 2. To achieve this effect, it is desirable to provide two crucibles 37.

B. Production of Carbon Material Using these Three Apparatuses, and Purification of the Carbon Material (Production of Carbon Material)

First, the upper and lower chambers 1 and 2 of the carbon material production apparatus described in (1) were evacuated by a vacuum pump (not shown) to a pressure equal to or lower than 5 Torr. Next, helium gas was introduced into the upper and lower chambers 1 and 2 until the inner pressure reaches 200 Torr. Then, while supplying a current of 450 A, a 25V DC voltage was applied between the electrodes, with their distance L1 maintained at 5 mm, to generate arc discharge. (An arc plasma was generated in the region 8 shown in FIG. 1). The arc discharge evaporated carbon, catalyst metal and other components from the anode 4. The vapors of these components were conveyed by the helium gas to the surface of the cold trap 6 in the upper chamber 1. Upon contact with the cold trap 6, the vapors were cooled, whereby an unpurified carbon material 9 was formed. After the arc discharge was discontinued, the inside of the upper and lower chambers 1 and 2 was adequately cooled and then opened into the atmosphere. Eventually, an unpurified carbon material, which was deposited inside the upper chamber 1, was collected in an amount of 5.3 g.

(Purification of Carbon Material)

Purification of the carbon material involved the following three processes (1) through (3).

(1) Halogen Treatment Process

The unpurified carbon material (500.0 mg) was put into the crucible 15, and this crucible 15 was set in the halogen treatment apparatus shown in FIG. 2. Then, the chamber 11 was evacuated to a pressure equal to or lower than 1 Torr, and electric power was supplied to the carbon heater 13 to raise the inner temperature of the chamber 11 to 1000° C. Subsequently, argon gas was introduced from the gas supply line 17 into the chamber 11 to regulate the pressure in the chamber 11 to be 70 Torr. After this pressure level was achieved, the argon gas was introduced into the chamber 11 at a rate of 1 L/min. Then, in addition to the argon gas, chlorine gas was introduced through the gas supply line 17 into the chamber 11 to regulate the pressure in the chamber 11 to be 90 Torr. After this pressure level was achieved, the chlorine gas was supplied into the chamber 11 at a rate of 0.3 L/min. After this state was maintained for one hour, the power supply was discontinued, and the introduction of the argon gas and chlorine gas was terminated, to carry out vacuum cooling. The vacuum cooling was continued at a pressure equal to or lower than 1 Torr for 12 hours. After it was confirmed that the inside temperature of the chamber 11 was cooled to room temperature, nitrogen gas was introduced into the chamber 11 until the pressure reached atmospheric pressure. After that, the chamber 11 was opened to remove the crucible 15. Thus, the halogen treatment of the unpurified carbon material was completed. After the halogen treatment, the carbon material weighed 326.9 mg.

(2) Oxidation Treatment Process

The halogen-treated carbon material (200 mg) was put in the crucible 37 shown in FIGS. 3 and 4. Then, while argon gas was introduced from the first cylinder 34 into the oxidation treatment furnace 31, the oxidation treatment furnace 31 was heated to 400° C. by the heater 36. In this state, the crucible 37 with the carbon material contained therein was set in the oxidation treatment furnace 31, and then the valve of the first cylinder 34 was closed and that of the second cylinder 35 opened to introduce a mixture of argon gas and oxygen gas into the oxidation treatment furnace 31 (with an argon-to-oxygen ratio of 80:20 in volume). The introduction rate of the mixture gas was 1 L/min. The purpose of using the argon gas in addition to the oxygen gas was to moderate the oxidation of carbon nanotubes by the presence of the argon gas, i.e. to control the speed of oxidation. After this state was maintained for 30 minutes, the crucible 37 was removed from the oxidation treatment furnace 31, and the carbon material was cooled in the crucible 37. Thus, the oxidation treatment of the halogen-treated carbon material was completed. After the cooling process, the carbon material weighed 110.9 mg.

(3) Another Halogen Treatment Process

With the same halogen treatment apparatus as used in the previously described halogen treatment process, the oxygen-treated carbon material (100 mg) was subjected to the halogen treatment once more. (This process may be hereafter called the halogen retreatment.) The conditions of the halogen retreatment process (e.g. the pressure and temperature inside the chamber 11) were entirely the same as those of the first halogen treatment process and will not be described in detail. After the halogen retreatment process, the carbon material weighed 65.6 mg.

EXAMPLES

First Set of Examples

Example 1

The carbon material obtained after "(1) Halogen Treatment Process" of the previously described best mode was used as Example 1.

The carbon material prepared in this manner is hereafter called the carbon material A1 of the invention.

Example 2

The carbon material obtained after "(2) Oxidation Treatment Process" of the previously described best mode was used as Example 2.

The carbon material prepared in this manner is hereafter called the carbon material A2 of the invention.

Example 3

The carbon material obtained after "(3) Another Halogen Treatment Process" of the previously described best mode was used as Example 3.

The carbon material prepared in this manner is hereafter called the carbon material A3 of the invention.

Comparative Example 1

In Comparative Example 1, the unpurified carbon material shown in the best mode of the present invention was treated by a wet purification process using hydrochloric acid. Specifically, the process was performed as follows.

First, the unpurified carbon material (500.0 mg) was put into a 500 ml Erlenmeyer flask, and concentrated hydrochloric acid (100 ml) with a concentration of 35% by weight was poured into the same flask. Then, the flask was irradiated with ultrasonic waves for five minutes to disperse the unpurified carbon material in the concentrated hydrochloric acid solution. Subsequently, the flask was left at rest in a draft for 12 hours, after which the content was passed through a filter and washed with distilled water until the filtrate became neutralized. The remnant on the filter paper was flushed with distilled water into a 50 ml beaker. This beaker with the carbon material was dried in a dryer at 120° C. and then put into a vacuum drying furnace for a vacuum drying process at 120° C. for two hours. Thus, the hydrochloric acid treatment of the unpurified carbon material was completed. After the hydrochloric acid treatment, the carbon material weighed 488.6 mg.

The carbon material prepared in this manner is hereafter called the comparative carbon material Z1.

Comparative Example 2

The carbon material (200.0 mg) obtained after the hydrochloric acid treatment in Comparative Example 1 was treated with oxygen by the oxidation treatment apparatus shown in FIGS. 3 and 4. The conditions of the oxidation treatment process (e.g. the pressure and temperature inside the oxidation treatment furnace 31) were entirely the same as those of Example 2 and hence will not be described in detail. After the oxidation treatment process, the carbon material weighed 164.6 mg.

The carbon material prepared in this manner is hereafter called the comparative carbon material Z2.

Comparative Example 3

The carbon material (100.0 mg) obtained after the oxidation treatment in Comparative Example 2 was treated with hydrochloric acid once more. (This process may be hereafter called the hydrochloric acid retreatment.) The conditions of the hydrochloric acid retreatment process (e.g. the acid concentration, the period of time for the carbon material to be immersed in the acid, and so on) were entirely the same as those of the hydrochloric acid process in Comparative Example 1 and hence will not be described in detail. After the hydrochloric acid retreatment process, the carbon material weighed 27.4 mg.

The carbon material prepared in this manner is hereafter called the comparative carbon material Z3.

Comparative Example 4

A carbon material that had finished with the halogen treatment process was prepared in the same manner as Example 1 except that a carbon nanotube created by CVD was used. (It was a carbon nanotube manufactured by Unidym, with a G/D ratio of 8.5 in the unpurified state and an ash content of 31.45% by weight in the unpurified state.)

The carbon material prepared in this manner is hereafter called the comparative carbon material Y1.

(Experiments)

The following experiments (1) to (4) were carried out using the carbon materials A1 to A3 of the invention and comparative carbon materials Z1 to Z3 and Y1. The results are shown in Table 1.

(1) Evaluation of Crystallinity of Carbon Nanotubes

Evaluation of the crystallinity of carbon nanotubes is normally achieved by evaluating the G/D ratio measured by Raman spectroscopy. It is possible to additionally perform visual evaluation using TEM images. However, according to this evaluation method it is difficult to represent the crystallinity in quantitative forms. Taking this into account, a Raman spectroscopic method was used in this experiment. Specifically, the experiment was performed as follows.

In Raman spectrometry, the peak that appears within a range from 1570 to 1610 cm$^{-1}$ (typically at around 1590 cm$^{-1}$) in a Raman spectrum results from the in-plane contracting oscillation of the network of six-membered rings of graphite and is called the G-Band. The peak that appears within a range from 1320 to 1360 cm$^{-1}$ (typically at around 1340 cm$^{-1}$) results from the presence of defects and is called the D-Band. Accordingly, a larger value of the G/D ratio, which is defined as the ratio of the peak intensity of the G-Band to that of the D-Band, can be considered to be indicative of a smaller percentage of the defects in the graphene sheet forming the carbon nanotubes. Thus, this ratio can be used to evaluate the quality of carbon nanotubes in a carbon material containing the carbon nanotubes.

However, the intensity of the G-Band resonantly depends on the laser excitation wavelength used in the Raman spectrometry. This means that the G/D ratio also depends on the laser excitation wavelength. Therefore, it is necessary to use the same laser excitation wavelength so that the same evaluation index is applied to all the samples. In the present experiments, the Raman spectroscopic measurement used a YAG laser with a wavelength of 532 nm, and the spectrum was measured by ALMEGA, a microscopic Raman spectrometer of Thermo Nicolet Limited, in a macro mode.

(2) Purity Analysis of Carbon Material

The purity of each carbon material was determined by thermogravimetry/differential thermal analysis (TG/DTA). Specifically, the following operations were performed.

A carbon material (sample) was placed on a platinum dish and heated to 1000° C. at a rate of 10° C./min within a flow of air supplied at 400 ml/min to completely incinerate the sample. The purity of the carbon material was calculated from the weight of the ash that remained on the platinum dish. Then, the composition of the ash content was quantitatively analyzed from the XMA of the ash content, and the concentration of the metallic impurities contained in the carbon material was determined.

In TG/DTA, it is known that amorphous carbon is the first component to burn, followed by carbon nanotubes and graphite in this order, due to the difference in their oxidation-starting temperature. Therefore, by comparing the peak areas of the DTG, it is possible to know the compositional ratio of the amorphous carbon, carbon nanotubes and graphite in the carbon material containing single-walled carbon nanotubes.

(3) Relative Comparison of Amount of Surface Functional Groups on Carbon Material For the relative comparison of the amount of surface functional groups on the carbon materials, a water-vapor adsorption ratio was measured. It is known that a large quantity of surface functional groups (e.g. hydroxide groups or carbonyl groups) are present on the surface of the carbon nanotubes if a wet purification method (e.g. the hydrochloric acid treatment or retreatment in Comparative Examples) is used to remove metallic impurities from an unpurified carbon material. It can be said that the water-vapor adsorption ratio increases as the addition percentage of these surface functional groups becomes higher, while the water-vapor adsorption ratio decreases as the addition percentage of these surface functional groups becomes lower. For the measurement of the water-vapor adsorption ratio, Hydrosoap 1000HS-1, a product of Yuasa Ionics Inc., was used. As a pre-process, a vacuum drying process was performed at 100° C. for two hours, followed by the adsorption and desorption of 100° C. water vapors.

A quantitative measurement of oxygen by X-ray photoelectron spectroscopy (XPS) was also attempted to verify the result of relative comparison of the amount of surface functional groups on the carbon materials obtained by the measurement of the water vapor adsorption ratio. The XPS apparatus was AXIS-165, a product manufactured by Cratos Analytical and sold by Shimadzu Corporation. Specifically, a sample of the carbon material was fixed to a holder with a conductive adhesive and inserted into the XPS apparatus, and the measurement was initiated after the apparatus was evacuated to a pressure of $8 \times 10^{-9}$ Torr or lower. The X-ray was produced by using an Mg target with a current of 15 mA and acceleration voltage of 15 kV. The measurement was performed with an exposure time of 1000 ms and energy step of 0.5 eV, and a 1 s peak of oxygen element appearing near 532 eV and 1 s peak of carbon element appearing near 284 eV were observed. The oxygen quantity was determined by a sensitivity coefficient method. That is, the area of the 1 s peak of oxygen element was divided by a sensitivity coefficient (0.63), and the obtained value was further divided by the area of the 1 s peak of carbon element divided by a sensitivity coefficient (0.205). The resultant value was used as the O/C value.

(4) Other Operations

In addition to a qualitative analysis by X-ray diffraction (XRD), a TEM observation and energy dispersive X-ray analysis (EDX) within the TEM were performed to investigate the existence form of the metallic impurities in the soot-like powder.

(2) Results on Ash Percentage

As is evident from Table 1, the percentage of ash content (the catalyst metal and yttrium) of the unpurified carbon material was 50.8% by weight, whereas the percentages were lower in the cases where the dry purification process was performed according to the present invention; the percentages

TABLE 1

|  | Unpurified | After halogen treatment (hydrochloric acid treatment) | | | After oxidation treatment | | After halogen retreatment (hydrochloric acid retreatment) | |
| --- | --- | --- | --- | --- | --- | --- | --- | --- |
|  |  | Carbon material A1 | Comparative carbon material Z1 | Comparative carbon material Y1 | Carbon material A2 | Comparative carbon material Z2 | Carbon material A3 | Comparative carbon material Z3 |
| G/D ratio | 101 (8.5) | 115 | 49 | (8.8) | 115 | 95 | 134 | 87 |
| Ash content (% by weight) | 50.8 (31.5) | 20.6 | 49.8 | (17.9) | 35.2 | 73.6 | 0.07 | 8.7 |
| Metallic impurity concentration (% by weight) | Ni: 46.8 Y: 4.0 | Ni: 17.8 Y: 2.8 | Ni: 46.9 Y: 2.9 |  | Ni: 30.7 Y: 4.5 | Ni: 69.0 Y: 4.6 | Ni: 0.017 Y: 0.051 | Ni: 8.1 Y: 0.6 |
| Weight (mg) [to be used in the next process] | 500 | 326.9 [200] | 340.9 [200] |  | 110.9 [100] | 190.0 [100] | 65.6 | 88.3 |
| Purity (% by weight) | — | — | — |  | — | — | 99.9 | 91.3 |
| Water adsorption (cc/g) | — | — | — |  | — | — | 129.3 | 205.0 |
| O/C value | 0.028 | 0.008 | 0.049 |  | — | — | 0.015 | 0.058 |

(1) Results on G/D Ratio

As is evident from Table 1, the G/D ratios of the carbon materials treated by the dry purification process according to the present invention were larger than that of the unpurified carbon material; the G/D ratio of the unpurified carbon material prepared by arc discharge was 101, whereas the G/D ratio of the carbon material A1 of the invention after the halogen treatment was 115, that of the carbon material A2 of the invention after the oxidation treatment was 115, and that of the carbon material A3 of the invention after the halogen retreatment was 134. These results demonstrate that the defects in the graphene sheet decreased. By contrast, in the case where the wet purification process was performed, the G/D ratios of the processed carbon materials were lower than that of the unpurified carbon material despite the use of the same unpurified carbon material; the ratios were 49 for the comparative carbon material Z1 after the hydrochloric acid treatment, 95 for the comparative carbon material Z2 after the oxidation treatment, and 87 for the comparative carbon material Z3 after the hydrochloric acid retreatment. These results show that the defects in the graphene sheets increased.

This is most likely because using a wet purification process as in Comparative Examples causes carbon nanotubes to be damaged or broken due to the ultrasonic irradiation for dispersing the material in the aqueous acid solution, whereas the dry purification process used in the present invention does not require ultrasonic irradiation and therefore will not cause carbon nanotubes to be damaged or broken.

It should be noted that, in the case where the carbon material was prepared by CVD, the unpurified carbon material had a G/D ratio of 8.5, whereas the comparative carbon material Y1 after the halogen treatment had a value of 8.8, which was larger than that of the unpurified carbon material. However, in the case where the carbon material was prepared by CVD, the absolute value of the G/D ratio was much smaller than in the case where the carbon material was prepared by arc discharge. This is probably because preparing a carbon material by CVD causes more defects than in the case of arc discharge.

were 20.6% by weight for the carbon material A1 of the invention after the halogen treatment, 35.2% by weight for the carbon material A2 of the invention after the oxidation treatment, and 0.07% by weight for the carbon material A3 of the invention after the halogen retreatment. This demonstrates that the ash content was adequately removed. By contrast, in the case where the wet purification process was performed, the ash percentage of the carbon material was higher than that of the dry-purified carbon material despite the use of the same unpurified carbon material; the percentages were 49.8% by weight for the comparative carbon material Z1 after the hydrochloric acid treatment, 73.6% by weight for the comparative carbon material Z2 after the oxidation treatment, and 8.7% by weight for the comparative carbon material Z3 after the hydrochloric acid retreatment. These values demonstrate that the ash content was not adequately removed. Thus, it has been confirmed that the carbon materials A1 to A3 of the invention (particularly, carbon material A3) have extremely high percentages of carbon nanotubes as compared to the comparative carbon materials Z1 to Z3. (This comparison was made at the point in time where the same process was completed; for example, the carbon material A3 of the invention was compared with the comparative carbon material Z3.)

The ash percentage of the carbon material A2 of the invention after the oxidation treatment was higher than that of the carbon material A1 of the invention after the halogen treatment, and the ash percentage of the comparative carbon material Z2 after the oxidation treatment was higher than that of the comparative carbon material Z1 after the hydrochloric acid treatment. This is because of an increase in the relative percentage of the ash content in the carbon material due to the removal of the amorphous carbon by the oxidation treatment.

In the case where the carbon material was prepared by arc discharge, the rate of decrease in the ash percentage after the halogen treatment was approximately 59.4% ([(50.8−20.6)/50.8]×100), and in the case where the carbon material was prepared by a CVD method, the rate of decrease in the ash percentage after the halogen treatment was approximately 43.2% ([(31.45−17.85)/31.45]×100). These calculations demonstrate that the rate of decrease in the ash content in the latter case was lower.

(3) Results on Metallic Impurity Concentration

This experiment was performed in order to specifically clarify the compositions of the ash content.

As is evident from Table 1, the metallic impurity concentrations of the unpurified carbon material were 46.8% by weight of Ni element and 4.0% by weight of Y element. In the cases where the dry purification process according to the present invention was performed, the carbon material A1 of the invention after the halogen treatment contained 17.8% by weight of Ni element and 2.8% by weight of Y element, the carbon material A2 of the invention after the oxidation treatment contained 30.7% by weight of Ni element and 4.5% by weight of Y element, and the carbon material A3 of the invention after the halogen retreatment contained 0.017% by weight of Ni element and 0.051% by weight of Y element. By contrast, in the cases where the wet purification process was performed as in Comparative Examples using the same unpurified carbon material, the comparative carbon material Z1 after the hydrochloric acid treatment contained 46.9% by weight of Ni element and 2.9% by weight of Y element, the comparative carbon material Z2 after the oxidation treatment contained 69.0% by weight of Ni element and 4.6% by weight of Y element, and the comparative carbon material Z3 after the halogen retreatment contained 8.1% by weight of Ni element and 0.6% by weight of Y element.

These results show that there was only a minor difference in the residual quantity of the Y element between the carbon materials A1 to A3 of the invention and the comparative carbon materials Z1 to Z3, whereas the residual quantities of the Ni element in the carbon materials A1 to A3 of the invention were smaller than those of the comparative carbon materials Z1 to Z3. (This comparison was made at the point in time where the same process was completed; for example, the carbon material A1 of the invention was compared with the comparative carbon material Z1.) This demonstrates that the residual quantity of the Ni element significantly affects the amount of ash content.

In Example 3, the remaining quantity of Y element can be further decreased by raising the processing temperature in the halogen retreatment process to a level higher than the processing temperature in the halogen treatment process in Example 1 (to approximately 1200° C.). In addition, using Fe or Co in place of Ni as the catalyst metal as in the examples to be described later will also produce similar results.

(4) Results of Other Experiments

As is evident from Table 1, the carbon material A3 of the invention after the halogen retreatment had an extremely high purity of 99.9% by weight, while the comparative carbon material Z3 after the hydrochloric acid retreatment had a lower purity of 91.3% by weight. The carbon material A3 of the invention after the halogen retreatment had a smaller amount of water adsorption, 129.3 cc/g, while the comparative carbon material Z3 after the hydrochloric acid retreatment had a larger amount of water adsorption, 205.0 cc/g.

The results of the XPS measurement showed that the O/C value of the unpurified carbon material was 0.028. The O/C value of the carbon material A1 of the invention after the halogen treatment was 0.008, while that of the comparative carbon material Z1 after the hydrochloric acid treatment was 0.049. Thus, the O/C value of the comparative carbon material Z1 was larger than that of the carbon material A1 of the invention. Furthermore, the O/C value of the carbon material A3 of the invention after the halogen retreatment was 0.015, while that of the comparative carbon material Z3 after the hydrochloric acid retreatment was 0.058. Thus, the O/C value of the comparative carbon material Z3 was larger than that of the carbon material A3 of the invention. These results confirm that the O/C value is correlated with the amount of water-vapor adsorption. Though not shown in the above experiment, it has been also confirmed that the amount of water-vapor adsorption will be at a desired level (i.e. 200 cc/g or lower; more preferably 170 cc/g or lower) when the O/C value is 0.032 or smaller. Therefore, it is desirable that the O/C value be equal to or smaller than 0.032.

An XRD analysis of the unpurified carbon material proved the presence of Ni metal. Furthermore, a TEM observation of the same carbon material demonstrated the presence of some particles ranging from 10 to 30 nm in diameter, and an EDX analysis proved these particles to be Ni metal particles. It was also found that the Y element was barely located in the vicinity of single-walled carbon nanotubes and mostly present within graphite or amorphous carbon.

Though not shown in Table 1, it was confirmed that the carbon nanotubes in the comparative carbon materials Z1 to Z3 were flocculated while the carbon materials A1 to A3 of the invention were free from such inconveniences. The carbon material A3 of the invention had a TG/DTA oxidation-starting temperature of 600° C., which is higher than the normal level.

Second Set of Examples

Example 1

(1) Production of Carbon Material

As the apparatus for producing the carbon material, the apparatus of FIG. 1 shown in the best mode of the present invention was used. The differences from the best mode existed in that only Fe element (1.0 mol %) was used as the catalyst metal for the anode and a mixture of argon and hydrogen, with an argon-to-hydrogen ratio of 6 to 4, was used as the gas to be introduced into the upper and lower chambers. Eventually, an unpurified carbon material, which was deposited on the inside of the upper chamber 1, was collected in an amount of 2.1 g.

(2) Halogen Treatment

The unpurified carbon material (500.0 mg) was put in the crucible 15. Then, using the halogen treatment apparatus shown in FIG. 2, a halogen treatment was performed under the same conditions as described in the "Halogen Treatment Process" section of the best mode. The carbon material after the halogen treatment weighed 340.9 mg.

The carbon material prepared in the manner is hereafter called the carbon material B1 of the invention.

Example 2

The halogen-treated carbon material (200 mg) was put in a crucible. Then, using the oxidation treatment apparatus shown in FIG. 3, an oxidation treatment was performed under the same conditions as described in the "Oxidation Treatment Process" section of the best mode. After the oxidation treatment, the carbon material weighed 190 mg.

The carbon material prepared in the manner is hereafter called the carbon material B2 of the invention.

Example 3

The oxygen-treated carbon material (100.0 mg) was put in the crucible 15. Then, using the halogen treatment apparatus shown in FIG. 1, a halogen retreatment process was performed under the same conditions as described in the "Another Halogen Treatment Process" section of the best mode. After the halogen retreatment, the carbon material weighed 88.3 mg.

The carbon material prepared in the manner is hereafter called the carbon material B3 of the invention.

(Experiments)

Using the carbon materials B1 to B3 of the invention, experiments for (1) the evaluation of crystallinity of carbon nanotubes, (2) the purity analysis of the carbon material and (3) the relative comparison of the amount of the surface functional group of the carbon material were performed in the same manner as in the first set of examples. The results are as shown in Table 2.

TABLE 2

|  | Unpurified | After halogen treatment Carbon material B1 | After oxidation treatment Carbon material B2 | After halogen retreatment Carbon material B3 |
|---|---|---|---|---|
| G/D ratio | 22 | 58 | 34 | 20 |
| Ash content (% by weight) | 58.5 | 7.88 | 18.81 | 14.31 |
| Metallic impurity concentration (% by weight) | Fe: 58.5 | Fe: 7.88 | Fe: 18.81 | Fe: 14.31 |
| Weight (mg) [to be used in the next process] | 500 | 340.9 [200] | 190.0 [100] | 88.3 |
| Water adsorption (cc/g) | — | — | — | 110.9 |

(1) Result on G/D Ratio

As is evident from Table 2, the G/D ratio of the unpurified carbon material was 22. In the cases where a dry purification process according to the present invention was performed, the G/D ratio of the carbon material B1 of the invention after the halogen treatment was 58, that of the carbon material B2 of the invention after the oxidation treatment was 34, and that of the carbon material B3 of the invention after the halogen retreatment was 20. These G/D ratios are smaller than those of the carbon materials A1 to A3 of the invention in the first set of examples.

This is most likely because the unpurified carbon metal used for preparing the carbon materials B1 to B3 of the invention was produced using only the Fe element as the catalyst metal, whereas the catalyst metal used for the preparation of the carbon materials A1 to A3 of the invention in the first set of examples contained not only the Ni element (which acts as a catalyst metal similar to the Fe element) but also Y element.

(2) Results on Ash Percentage and Metallic Impurity Concentration

As is evident from Table 2, the ash percentage of the unpurified carbon material was 58.5% by weight. In the cases where a dry purification process according to the present invention was performed, the ash percentage of the carbon material B1 of the invention after the halogen treatment was 7.88% by weight, that of the carbon material B2 of the invention after the oxidation treatment was 18.81% by weight, and that of the carbon material B3 of the invention after the halogen retreatment was 14.31% by weight. Although the carbon materials B1 and B2 of the invention were comparable to the carbon materials A1 and A2 of the invention in terms of the ash content removal, the carbon material B3 of the invention was inferior to the carbon material A3 of the invention. The reason for this is hereinafter explained with reference to FIG. 5.

a. If a portion of the surface of the Ni (or Fe) particle is not covered with a carbon coating composed of amorphous carbon or graphite:

As shown in FIG. 5(a), in the case where a portion of the surface of the Ni (or Fe) particle 40 in the unpurified carbon material (immediately after the synthesis) is not covered with a carbon coating 42 composed of amorphous carbon or graphite (i.e. if at least a portion of the surface of the Ni particle 40 is exposed), if a halogen treatment using a halogen gas 43 (e.g. chlorine gas) is performed, the halogen gas 43 comes into direct contact with the Ni particle 40, so that the Ni particle 40 can be smoothly removed by the halogen treatment. As a result, when a portion of the surface of the Ni particle 40 is not covered with the carbon coating 42, the Ni particle 40 will be removed regardless of whether a Y particle 41 is present.

b. If the entire surface of the Ni (or Fe) particle is covered with a carbon coating composed of amorphous carbon or graphite, and a Y particle is contained:

As shown in FIG. 5(b), if the entire surface of the Ni (or Fe) particle 40 in the unpurified carbon material (immediately after the synthesis) is covered with a carbon coating 42 (i.e. if the surface of the Ni particle 40 is not exposed at all), the Ni particle 40 will not be removed by a halogen treatment using a halogen gas 43 (e.g. chlorine gas) since the halogen gas 43 cannot come in direct contact with the Ni particle 40. However, in the oxidation treatment that follows the halogen treatment, the Y particle 41 works as a catalyst, so that the carbon coating 42 on the surface of the Ni particle 40 will be removed by the oxidation treatment process. With the surface of the Ni particle 40 thus exposed, if a halogen retreatment is performed, the halogen gas 43 comes into direct contact with the Ni particle 40, so that the Ni particle 40 can be smoothly removed by the halogen retreatment. Thus, even if the entire surface of the Ni particle 40 is covered with the carbon coating 42, the Ni particle 40 will be removed if the Y particle 41 is present.

c. If the entire surface of the Ni (or Fe) particle is covered with a carbon coating composed of amorphous carbon or graphite, and no Y element is contained:

As shown in FIG. 5(c), if the entire surface of the Ni (or Fe) particle 40 is covered with a carbon coating 42, the Ni particle 40 will not be removed by the halogen treatment using a halogen gas 43 (e.g. a chlorine gas) since, similar to the case b., the halogen gas 43 cannot come in direct contact with the Ni particle 40. Furthermore, in the oxidation treatment that follows the halogen treatment, the carbon coating 42 (particularly, a graphite coating with a high degree of crystallinity) on the surface of the Ni particle 40 cannot be fully removed since no Y particle 41 is present. As a result, the halogen retreatment is performed with the surface of the Ni particle 40 unexposed, and the halogen gas 43 cannot come in direct contact with the Ni particle 40. Therefore, the Ni particle 40 will not be removed. Thus, if the entire surface of the Ni particle is covered with a carbon coating 42 composed of amorphous carbon or graphite and no Y particle is contained, the Ni particle 40 will not be removed.

d. Conclusion

Due to the reasons explained in the preceding sections a. through c., it is possible to fully remove ash contents from the carbon material A3 of the invention, which contains Y particles, whereas it is impossible to fully remove ash contents from the carbon material B3 of the invention, which does not contain Y particles. It is therefore preferable to have a Y element involved in the manufacturing of the carbon material containing carbon nanotubes.

(3) Results of Other Experiments

As is evident from Table 2, the carbon material B3 of the invention after the halogen retreatment had a small amount of water adsorption of 110.9 cc/g.

(4) Advantages of Using Fe as Catalyst Metal for Anode, and Its Improvement

From the previously described experimental results, it may seem difficult to derive many advantages from the use of Fe as a catalyst material for the anode. However, it is generally known that, if hydrogen is used as an atmospheric gas and arc discharge is performed using an anode consisting of a metal/carbon composite electrode that contains Fe, the resulting carbon material will barely contain amorphous carbon since hydrogen removes amorphous carbon (refer to Non-Patent Document 3). Another generally acknowledged advantage is that the carbon coating around the Fe particle will have only a few layers, each layer being thin.

However, in the carbon material containing carbon nanotubes prepared in this manner, some of the Fe particles are entirely covered with a high-crystallinity graphite coating that could not be removed by hydrogen, and such particles are difficult to remove by a chlorine treatment or halogen treatment. Therefore, in order to obtain a high-purity carbon material, it is necessary to oxidize the graphite coating by air or hydrogen peroxide water. Since graphite coatings are more stable than carbon nanotubes, a strong oxidation treatment is required to remove a graphite coating. Unfortunately, such a treatment removes not only the graphite coating but also most of the carbon nanotubes, which decreases the purification yield.

To avoid this problem, it is effective to mix Y into the carbon material containing carbon nanotubes by using a hydrogen gas as the atmospheric gas and an anode consisting of a metal/carbon composite electrode containing Fe and Y as the catalyst metals. The carbon material prepared in this manner originally contains only a small amount of amorphous carbon. Furthermore, the addition of Y facilitates the removal of the graphite coating on the surface of the Fe particle and hence allows a relatively weak oxidation treatment to be used for purification. As a result, the purification yield of the carbon nanotubes will be dramatically improved.

Other Embodiments (1) Although the unpurified carbon material was prepared by arc discharge in the previous examples, the preparation method is not limited to this one. It is naturally possible to use laser evaporation, CVD or other techniques to prepare an unpurified carbon material in the present invention. However, if it is necessary to produce a high-purity carbon material that contains high-crystallinity carbon nanotubes, using a carbon material synthesized by arc discharge or laser evaporation is desirable.

(2) Although the carbon nanotubes in the present invention may be either single-walled or multi-walled tubes, the present invention is more effective when applied to single-walled carbon nanotubes. In the case of multi-walled carbon nanotubes, metallic impurities can be removed by a simple heating process in an inert gas atmosphere, whereas single-walled carbon nanotubes undergo structural changes at 1400° C. or higher temperatures.

(3) Although the halogen treatment was performed at high temperatures in the previous examples, the treatment method is not limited to this one. It is also possible to obtain similar effects by performing the halogen treatment in a plasma.

(4) In the oxidation treatment process, oxygen gas was used as the oxidizing gas, and argon gas was used as the gas to be mixed with the oxidizing gas. However, the gases are not limited to these ones. It is also possible to use air or similar gas as the former gas, and nitrogen gas, helium gas or neon gas as the latter. The process of removing amorphous carbon or graphite is not limited to an oxidation treatment process; it is also possible to use a reduction treatment process using hydrogen gas. In this case, the amorphous carbon will be removed in the form of methane.

(5) If the carbon material containing carbon nanotubes is prepared by arc discharge, the percentage of the catalyst metal in the total amount of the anode material should preferably be 0.5 mol % or higher and 5 mol % or lower. If yttrium is contained in the anode material, the percentage of yttrium in the total amount of the anode material should preferably be 0.125 mol % or higher and 1.25 mol % or lower.

INDUSTRIAL APPLICABILITY

The present invention can be suitably applied, for example, to the materials for the cathodes of fuel cells or lithium secondary batteries, high-strength resins made of a composite with resin or organic semiconductor, conductive resins, shielding materials against electromagnetic waves, probes for scanning tunneling microscopes, field electron emission sources, materials for nano-tweezers, adsorption materials, medical nano-capsules, fibers, heat sinks, sliders, conductive aids for electrodes, catalyst supports, and materials for conductive films.

Figure 1:
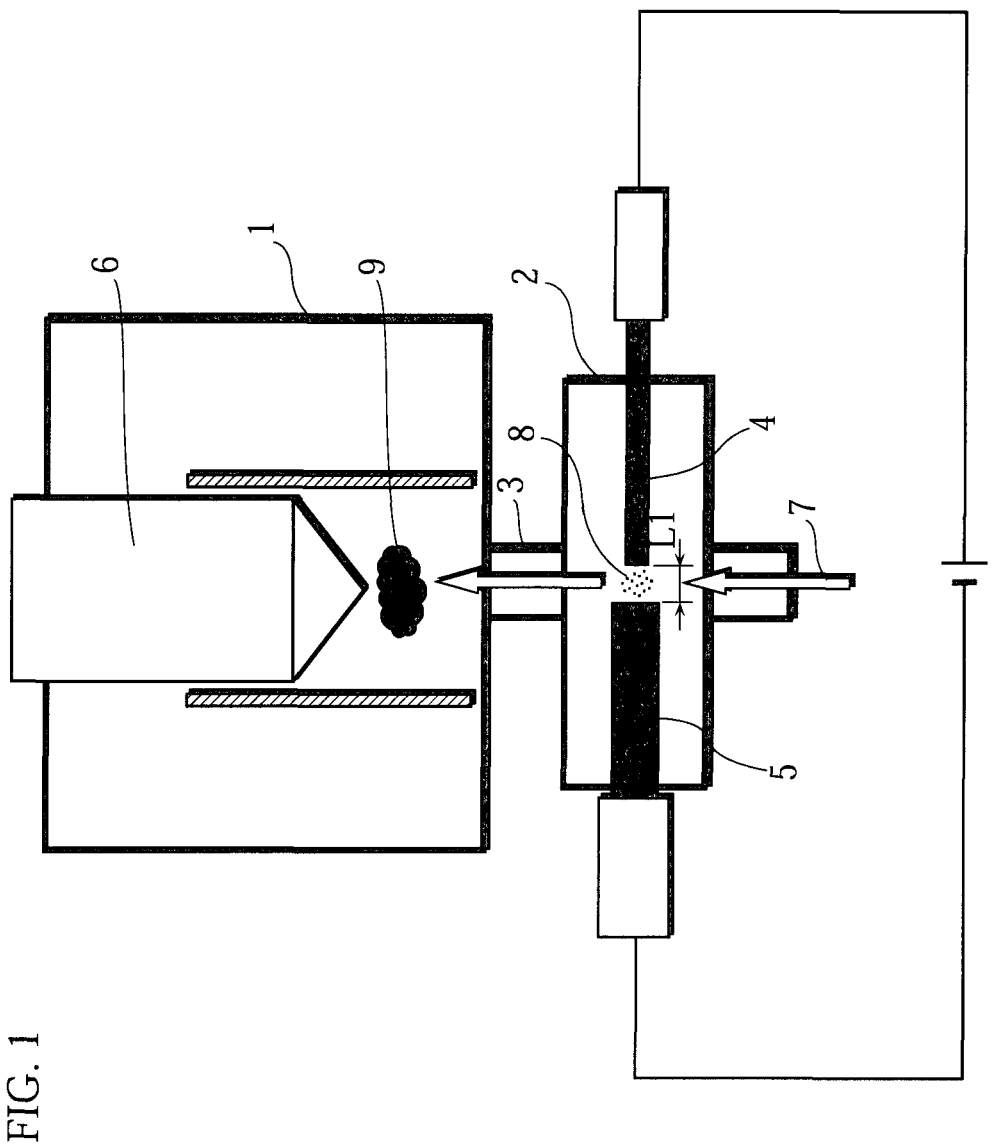
FIG. 1 is an illustrative diagram of an apparatus for producing a carbon material.
Figure 2:
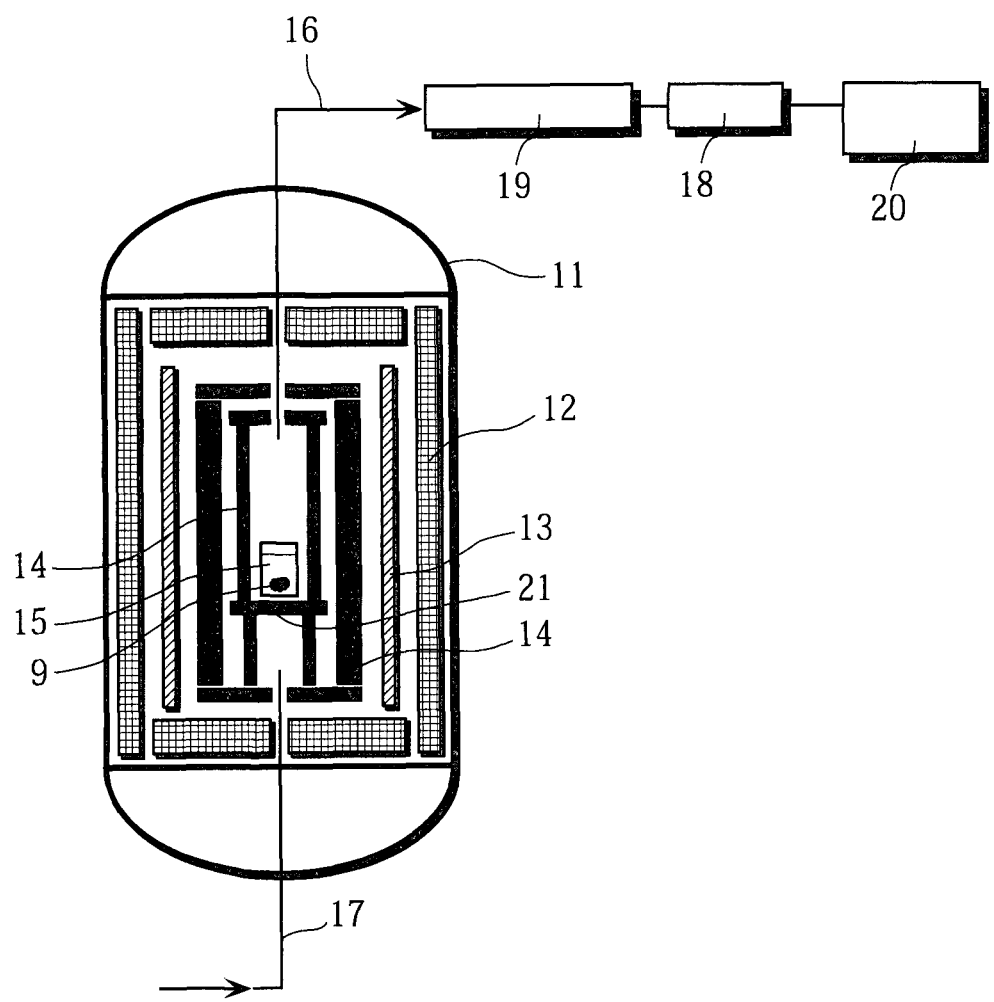
FIG. 2 is an illustrative diagram of a halogen treatment apparatus.
Figure 3:
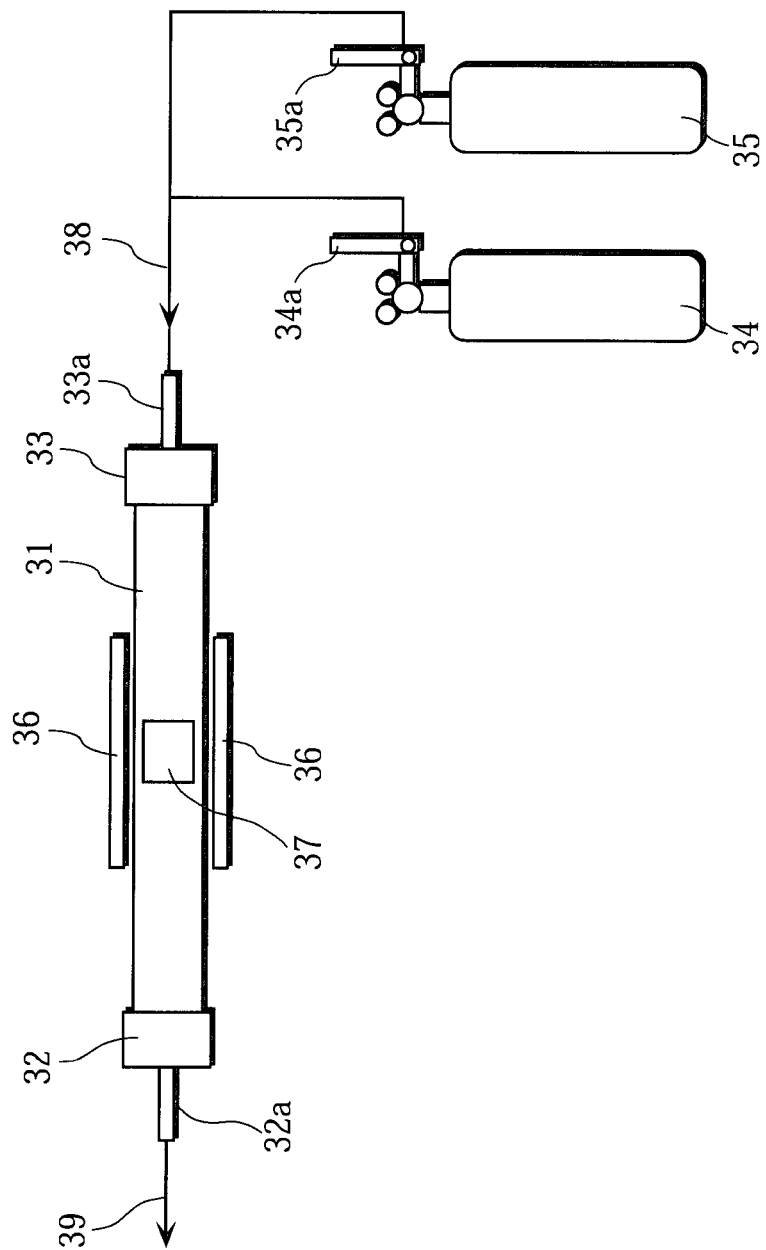
FIG. 3 is an illustrative diagram of an oxidation treatment apparatus.
Figure 4:
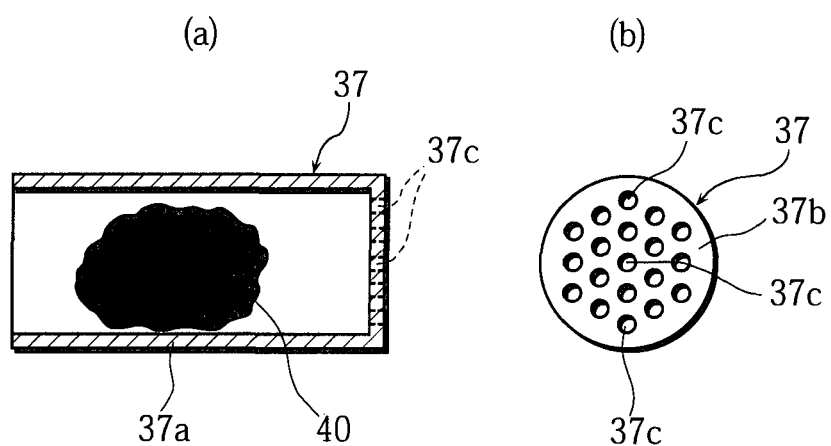
FIG. 4 is a diagram of a crucible used in the oxidation treatment apparatus, where (a) is a vertical sectional view and (b) is a side view.
Figure 5:
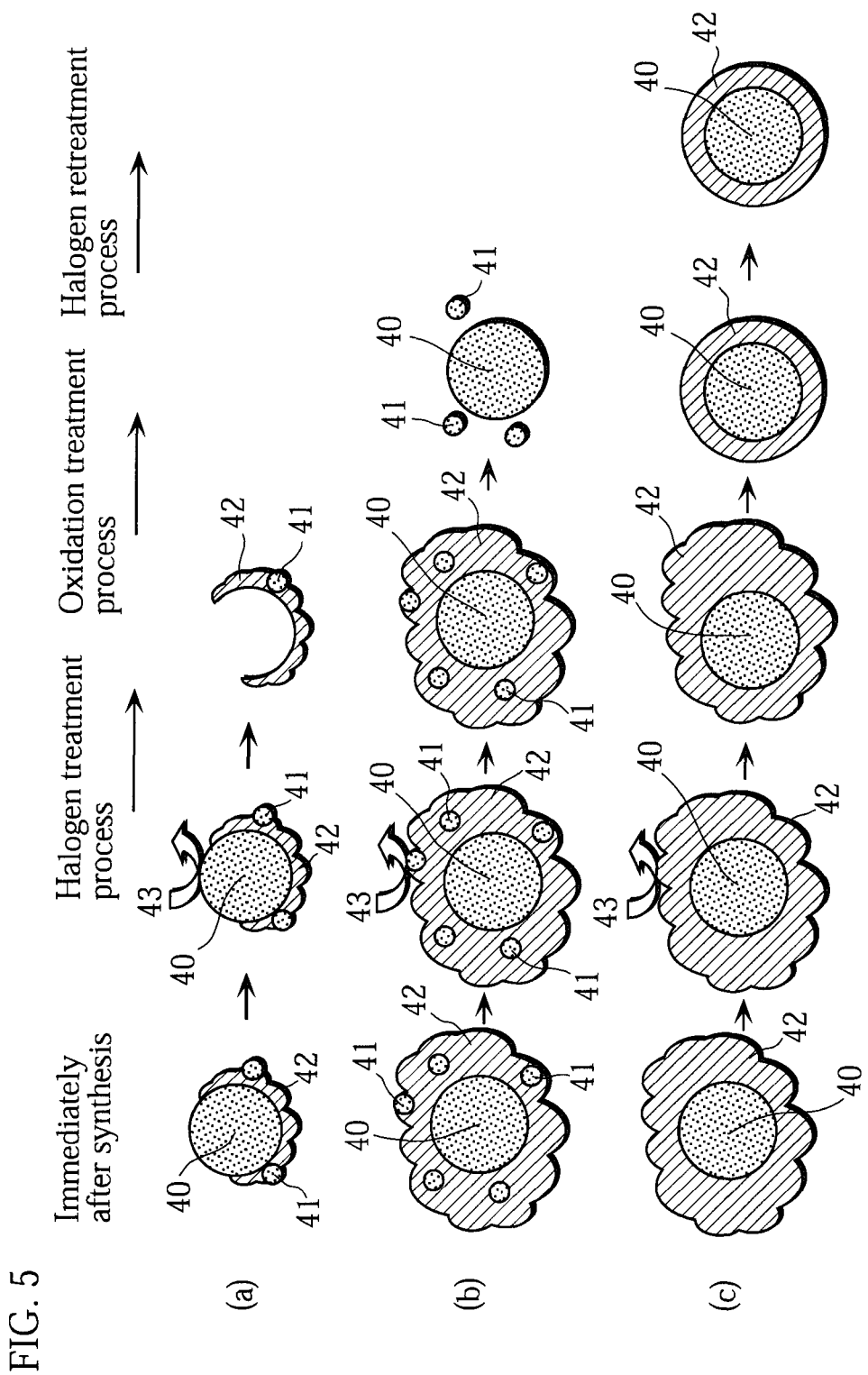
FIG. 5 is an illustrative diagram showing a process of removing metallic impurities or carbon coating; (a) shows the case where a portion of the surface of a catalyst metal is not covered with a carbon coating, (b) shows the case where the surface of a catalyst metal is entirely covered with a carbon coating, with Y particles contained therein, and (c) shows the case where the surface of a catalyst metal is entirely covered with a carbon coating, with no Y particles contained therein.

| EXPLANATION OF THE NUMERALS | |
|---|---|
| 4: | Anode |
| 5: | Cathode |
| 13: | Heater |
| 14: | Susceptor |
| 15: | Crucible |
| 31: | Oxidation treatment furnace |
| 34: | First cylinder |
| 35: | Second cylinder |
| 36: | Heater |
| 37: | Crucible |

The invention claimed is:

1. A purification method for a carbon material containing carbon nanotubes, comprising:
    a carbon material preparation process for preparing a carbon material containing carbon nanotubes by an arc discharge method, using an anode made of a material containing at least carbon and a catalyst metal;
    a first halogen treatment process for bringing the carbon material into contact with a gas containing a halogen and/or halogen compound;
    an oxidation treatment process for bringing the carbon material into contact with an oxygen gas-containing gas after the first halogen treatment process; and
    a second halogen treatment process after the oxidation treatment process,
    wherein the halogen treatment processes are performed within an ambient temperature range from 600° to 1600° C.;
    wherein the another halogen treatment process is performed within an ambient temperature range of 1200° C. or higher.

2. A purification method for a carbon material containing carbon nanotubes, comprising:
    a carbon material preparation process for preparing a carbon material containing carbon nanotubes by using a material containing at least carbon and a catalyst metal;
    a first halogen treatment process for bringing the carbon material into contact with a gas containing a halogen and/or halogen compound;
    an oxidation treatment process for bringing the carbon material into contact with an oxygen gas-containing gas, which is performed after the first halogen treatment process; and
    a second halogen treatment process performed after the oxidation treatment process,
    wherein the halogen treatment processes are performed within an ambient temperature range from 600° to 1600° C.;
    wherein the another halogen treatment process is performed within an ambient temperature range of 1200° C. or higher.

* * * * *